US010824980B2

(12) United States Patent
Vijayakar et al.

(10) Patent No.: US 10,824,980 B2
(45) Date of Patent: *Nov. 3, 2020

(54) CORE PROCESS FRAMEWORK FOR INTEGRATING DISPARATE APPLICATIONS

(71) Applicant: BANK OF AMERICA CORPORATION, Charlotte, NC (US)

(72) Inventors: Aneesh Pravin Vijayakar, Charlotte, NC (US); Srinivasa Rao Gedela, Princeton, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,713

(22) Filed: Dec. 18, 2019

(65) Prior Publication Data

US 2020/0126007 A1    Apr. 23, 2020

Related U.S. Application Data

(63) Continuation of application No. 16/011,364, filed on Jun. 18, 2018.

(51) Int. Cl.
G06Q 10/06    (2012.01)
G06F 9/54    (2006.01)

(52) U.S. Cl.
CPC ........... *G06Q 10/067* (2013.01); *G06F 9/541* (2013.01)

(58) Field of Classification Search
None
See application file for complete search history.

(56) References Cited

U.S. PATENT DOCUMENTS

| 5,968,167 | A  | 10/1999 | Whittaker |
| 6,073,109 | A  | 6/2000 | Flores et al. |
| 6,571,246 | B1 | 5/2003 | Anderson |
| 6,817,008 | B2 | 11/2004 | Ledford et al. |
| 6,920,474 | B2 | 7/2005 | Walsh et al. |
| 7,174,507 | B2 | 2/2007 | Baudin et al. |
| 7,765,291 | B1 | 7/2010 | Khan |
| 7,788,319 | B2 | 8/2010 | Schmidt et al. |
| 7,802,073 | B1 | 9/2010 | Cheng et al. |

(Continued)

*Primary Examiner* — Syed A Roni
(74) *Attorney, Agent, or Firm* — Michael A. Springs; Moore & Van Allen PLLC; James C. Edwards

(57) ABSTRACT

A system, method and the like for seamlessly integrating disparate applications, such as channel applications and off-the-shelf business process management services/applications through use of a core process framework that provides a vendor/third-party entity-agnostic approach to application integration. The core process framework provides various fundamental processes that are shared amongst applications that are in communication with the framework. The core process framework leverages a headless business process management and middleware integration patterns that serve to create an open architecture with reduced dependency on the third-party entity/vendor providing the business process management service. In this regard, the core process framework of the present invention provides a service platform that clients (i.e., channel applications) can make service requests/calls to, via an integration gateway or the like, to perform multiple different generic business process management engine-related operations.

13 Claims, 12 Drawing Sheets

(56) References Cited

U.S. PATENT DOCUMENTS

| | | |
|---|---|---|
| 8,136,114 B1 | 3/2012 | Gailloux et al. |
| 8,380,716 B2 | 2/2013 | Mirus |
| 8,589,482 B2 | 11/2013 | Tiu, Jr. et al. |
| 8,752,030 B1 * | 6/2014 | Chen |
| 8,943,054 B2 | 1/2015 | Caruso |
| 8,996,496 B2 | 3/2015 | Stiers |
| 9,064,236 B2 | 6/2015 | Gazetov et al. |
| 9,148,392 B1 | 9/2015 | Kelly et al. |
| 9,336,268 B1 | 5/2016 | Moudy et al. |
| 9,336,325 B2 | 5/2016 | Bamford |
| 9,635,081 B2 | 4/2017 | Stiers |
| 9,648,114 B2 | 5/2017 | Carmichael et al. |
| 9,692,722 B2 | 6/2017 | Verma et al. |
| 10,528,633 B2 | 1/2020 | Altaf et al. |
| 2004/0176980 A1 | 9/2004 | Bulitta et al. |
| 2006/0085245 A1 | 4/2006 | Takatsuka et al. |
| 2006/0224702 A1 | 10/2006 | Schmidt et al. |
| 2007/0106761 A1 | 5/2007 | Beoughter et al. |
| 2007/0150895 A1 | 6/2007 | Kurland |
| 2009/0006167 A1 | 1/2009 | Toussaint et al. |
| 2009/0064104 A1 | 3/2009 | Baeyens et al. |
| 2009/0171720 A1 | 7/2009 | Crook et al. |
| 2011/0078584 A1 | 3/2011 | Winterstein et al. |
| 2011/0179058 A1 | 7/2011 | Purcell et al. |
| 2011/0202544 A1 | 8/2011 | Carle et al. |
| 2011/0238458 A1 | 9/2011 | Purcell et al. |
| 2012/0036200 A1 | 2/2012 | Cole et al. |
| 2012/0036204 A1 | 2/2012 | Cole |
| 2012/0036206 A1 | 2/2012 | Cole |
| 2012/0036207 A1 | 2/2012 | Cole et al. |
| 2012/0296628 A1 | 11/2012 | Wren et al. |
| 2013/0132339 A1 | 5/2013 | Mirus |
| 2013/0166721 A1 | 6/2013 | Soffer et al. |
| 2013/0282746 A1 | 10/2013 | Balko et al. |
| 2014/0040374 A1 | 2/2014 | Olsen et al. |
| 2014/0229541 A1 | 8/2014 | Dilio et al. |
| 2015/0067043 A1 | 3/2015 | Agarwal et al. |
| 2015/0081674 A1 | 3/2015 | Ali et al. |
| 2015/0088981 A1 | 3/2015 | Brousseau et al. |
| 2015/0100586 A1 | 4/2015 | Caruso |
| 2015/0256475 A1 | 9/2015 | Suman et al. |
| 2016/0070800 A1 | 3/2016 | Malkin et al. |
| 2016/0098661 A1 * | 4/2016 | Viswanathan |
| 2017/0142930 A1 | 5/2017 | Huang et al. |
| 2017/0161277 A1 | 6/2017 | Eulenstein et al. |
| 2017/0293864 A1 | 10/2017 | Oh et al. |
| 2017/0308909 A1 | 10/2017 | Faith et al. |
| 2017/0351560 A1 | 12/2017 | Smith, Jr. et al. |
| 2018/0210957 A1 | 7/2018 | Altaf et al. |
| 2019/0130243 A1 | 5/2019 | Penubothula et al. |

* cited by examiner

CORE PROCESS FRAMEWORK FOR INTEGRATING DISPARATE APPLICATIONS

CROSS-REFERENCE TO RELATED APPLICATION

This application is a continuation of and claims priority from U.S. Pat. No. 10,614,406, issued on Apr. 7, 2020, and entitled "Core Process Framework for Integrating Disparate Applications".

FIELD OF THE INVENTION

The present invention is generally directed to computer data processing and, more specifically, seamlessly integrating disparate applications, such as channel applications and off-the-shelf process management applications through use of a core process framework that provides a process management type-agnostic and third-party entity-agnostic approach to application integration.

BACKGROUND

Enterprises use various channel applications associated with the various channel platforms that are used for internal and external communication. Many of these channel applications are required to interface with process management services, commonly referred to as Business Process Management (BPM) services as a means of conducting events/processing data associated with the channel applications.

In many instances, when a channel application makes a service call to a BPM service, the some of the operations performed by the BPM service are generic operations that would be required of any BPM service regardless of the type of BPM service or the third-party entity/vendor providing the BPM service.

Furthermore, in many instances that channel applications may be incompatible with process management services in terms of Application Programming Interfaces (APIs), message language, message format and the like. While channel applications may be configured to be compatible with specific off-the-shelf process management services, such configuration is problematic in the event that the channel application requires further services or the enterprise desires to use a different type or provider (i.e., vendor, third-party entity) for the off-the-shelf process management service. In such instances, the enterprise is typically required to revise or implement a new channel application to accommodate the new type and/or new provider of the process management service.

Therefore, a need exists to develop an intermediary framework that seamlessly integrates disparate applications, such as channel applications and off-the shelf process management applications and provides for abstraction of common BPM functions. The desired systems, methods and the like should provide for standard implementation across all applications regardless of the type of application/service and the provider (i.e., BPM type-agnostic and/or third party-entity/vendor-agnostic). In this regard, the desired systems, methods and the like should provide generic operations associated with functions, such as authentication/authorization, entitlement and the like. Moreover, the desired systems, methods and the like should provide for changes/upgrades/enhancements in the Application Programming Interfaces (APIs) of the process management services to be transparent to the channel applications. In addition, the desired systems, methods and the like should provide visibility to request processing flows, traceability via logging of every action taken, standardization of error handling and the like.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing systems, methods, computer program product and/or the like for seamlessly integrating disparate applications, such as channel applications and off-the-shelf business process management (BPM) services/applications through use of a core process framework that provides a process management type-agnostic and vendor/third-party entity-agnostic approach to application integration. The core process framework of the present invention implements a headless BPM and middleware integration patterns that serve to create an open architecture with reduced dependency on the third-party entity/vendor providing the BPM service. In this regard, the core process framework of the present invention provides a service platform that clients (i.e., channel applications) can make service requests/calls to, via an integration gateway or the like, to perform multiple different generic BPM engine-related operations.

In specific embodiments of the invention, the core process framework includes a translation engine that is configured to translate message associated with core process engine APIs into a programming language that is compatible with an associated BPM service. Additional BP-engine related operations include, but are not limited to, (i) security in the form of authentication/authorization using framework integration patterns integrated with entitlement systems to define BPM roles and user accessibility, (ii) embedded shared services including instrumentation as a service, auditing function and the like, (iii) data routing, (iv) visibility to request data processing workflows and logging functions to provide traceability of every action taken by the framework, (v) process error reporting and related alert/notification communication, (vi) process queue management and the like.

A system for integrating channel applications with business process management (BPM) services defines first embodiments of the invention. The system includes a first computing platform disposed within a distributed communication network and including a first memory and at least one first processor in communication with the first memory. A plurality of channel applications are stored in the first memory, executable by the first processor, and include a plurality of Application Programming Interfaces (APIs), the channel applications are configured to make service calls to one of a plurality of business process management (BPM) services. The system additionally includes a second computing platform disposed within the distributed communication network and including a second memory and at least one second processor in communication with the second memory. A core process framework is stored in the second memory, executable by the second processor and in communication with a core process engine that implements a business process management engine API, wherein the core process framework is configured to intercept the service calls from the channel applications and implement the BMP engine API to perform at least one generic BPM engine-related operations prior to forwarding the service call to an associated BPM service.

In specific embodiments of the system, the plurality of BPM services are provided by a corresponding one of a plurality of third-party entities/vendors and the core process framework is further configured to perform the BPM-engine related operations in a third-party entity-agnostic manner (i.e., the operations can be performed regardless of which third-party entity provides the platform for the BPM).

In other specific embodiments of the system, the core process framework is configured to implement the BMP engine API to translate the service call from a channel application computing language to a computing language that is compatible with the associated BPM service. In such embodiments of the system, the translation may be to a computing language that is compatible with a user interface (UI) of the associated BPM service.

In other specific embodiments of the system the core process framework implements a plurality of middleware integration patterns to perform BPM engine-related operations (e.g., authentication and authorization) for the associated BPM service. In other specific embodiments of the system, the core process framework implements headless business process management (BPM) to execute process flows absent a Graphical User Interface (GUI).

In still further specific embodiments of the invention, the plurality of BPM services include at least one of (i) a case management service configured to manage incidents within an enterprise that are relegated to case status, (ii) a process analytics service configured to provide analytical data associated with enterprise processes, (iii) a mobile service configured to provide data in a mobile format for presentation on mobile platforms, and (iv) a social media service configured to communicate with social media listeners to receive enterprise-specific social media content and provide analytical data associated with the social media content.

In other specific embodiments of the system the core process framework is configured to implement the BMP engine API to perform at least one of user entitlement, service call queue management and service call routing.

In other specific embodiments of the system, the core process framework is configured to provide for standardized error processing and, in response to incurring an error, alert notification. In still further specific embodiments of the system the core process framework is configured to record in a log each action associated with the generic BPM engine-related operations and provide access user access to the log.

A computer-implemented method for integrating channel applications with business process management (BPM) services defines second embodiments of the invention. The method is executed by a computing device processor and includes transmitting, from a channel application, a service call to one of a plurality of BPM services and intercepting, at a core process framework, the service call prior to the BPM service receiving the service call. The method further includes implementing, at the core process framework, a BMP engine API to perform at least one generic BPM engine-related operation associated with the service call, and forwarding, by the core process framework, the service call to the BPM service.

In specific embodiments of the computer-implemented method, the plurality of BPM services are provided by a corresponding one of a plurality of third-party entities and implementing further includes implementing the BMP engine API to perform the at least one generic BPM-engine related operation in a third-party entity-agnostic manner.

In other specific embodiments of the computer-implemented method, implementing further includes implementing, at the core process framework, the BMP engine API to translate the service call from a channel application computing language to a computing language that is compatible with the associated BPM service and/or a user interface (UI) of the associated BPM service.

In still further specific embodiments of the computer-implemented method, implementing further includes implementing a plurality of middleware integration patterns to perform BPM engine-related operations (e.g., authentication and authorization) for the associated BPM service. In other specific embodiments of the computer-implemented method, implementing further comprises implementing, at the core process framework, the BMP engine API to perform at least one of user entitlement, service call queue management and service call routing.

A computer program product including a non-transitory computer-readable medium defines third embodiments of the invention. The computer-readable medium includes a first set of codes for causing a computer to transmit, from a channel application, a service call to one of a plurality of BPM services and a second set of codes for causing a computer to intercept, at a core process framework, the service call prior to the BPM service receiving the service call. The computer-readable medium additionally includes a third set of codes for causing a computer to implement, at the core process framework, a BMP engine API to perform at least one generic BPM engine-related operation associated with the service call, and a fourth set of codes for causing a computer to forward, by the core process framework, the service call to the BPM service.

In specific embodiments of the computer program product, the third set of codes is further configured to cause the computer to implement, at the core process framework, a BMP engine API to perform at least one generic BPM engine-related operation, wherein the BPM engine-related operation includes at least one of (i) translating the service call from a channel application computing language to a computing language that is compatible with the associated BPM service, (ii) authentication and authorization, (iii) user entitlement, (iv) service call queue management and (v) service call routing.

Thus, according to embodiments of the invention, which will be discussed in greater detail below, the present invention provides for seamlessly integrating disparate applications, such as channel applications and off-the-shelf business process management (BPM) services/applications through use of a core process framework that provides a vendor/third-party entity-agnostic approach to application integration. The core process framework of the present invention provides for various basic or otherwise "core" processes that are shared amongst applications that are in communication with the framework. Fundamental to the core process framework is the implementation of a headless BPM and middleware integration patterns that serve to create an open architecture with reduced dependency on the third-party entity/vendor providing the BPM service. In this regard, the core process framework of the present invention provides a service platform that clients (i.e., channel applications) can make service requests/calls to, via an integration gateway or the like, to perform multiple different generic BPM engine-related operations.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
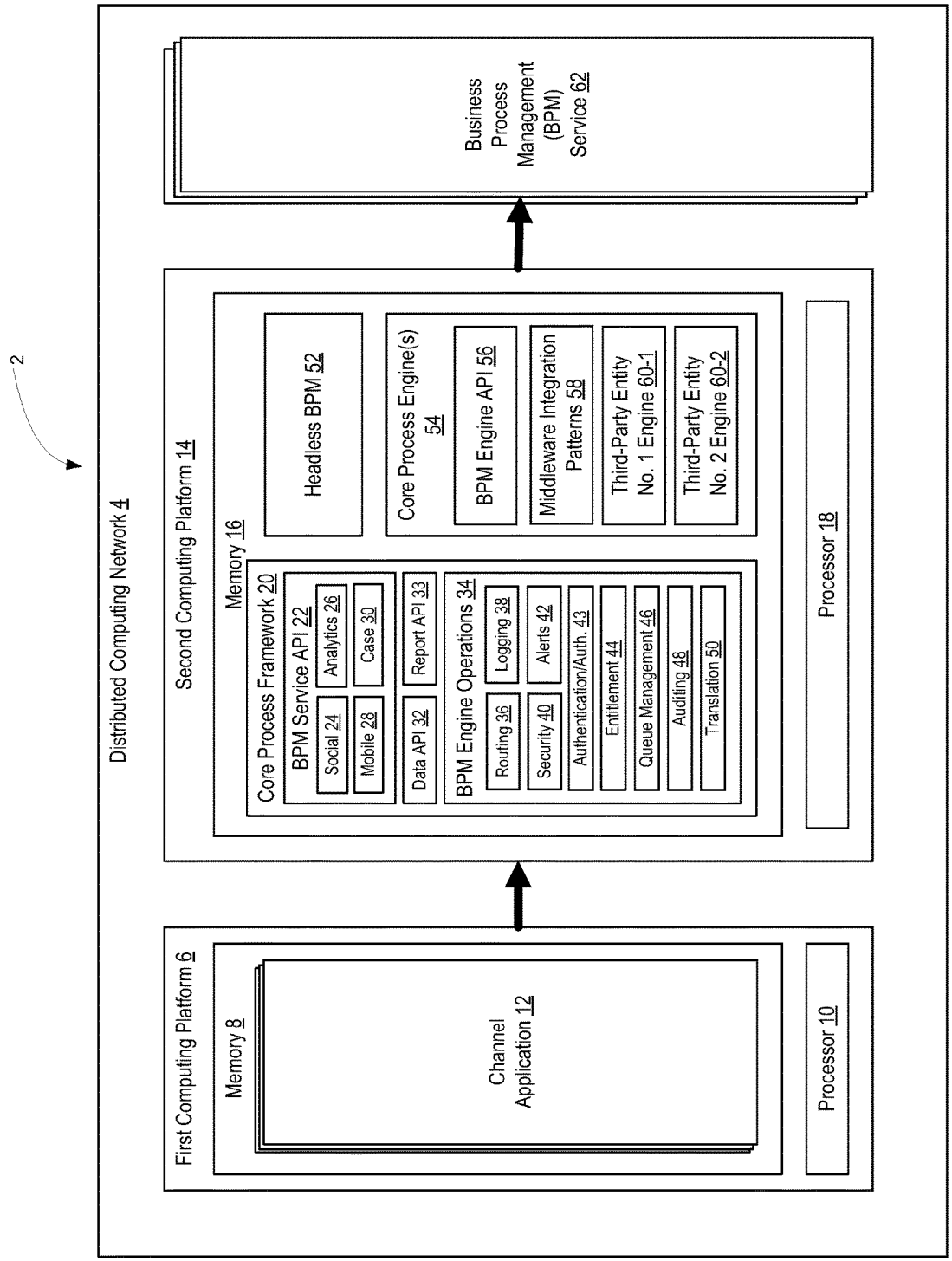
Figure 2:
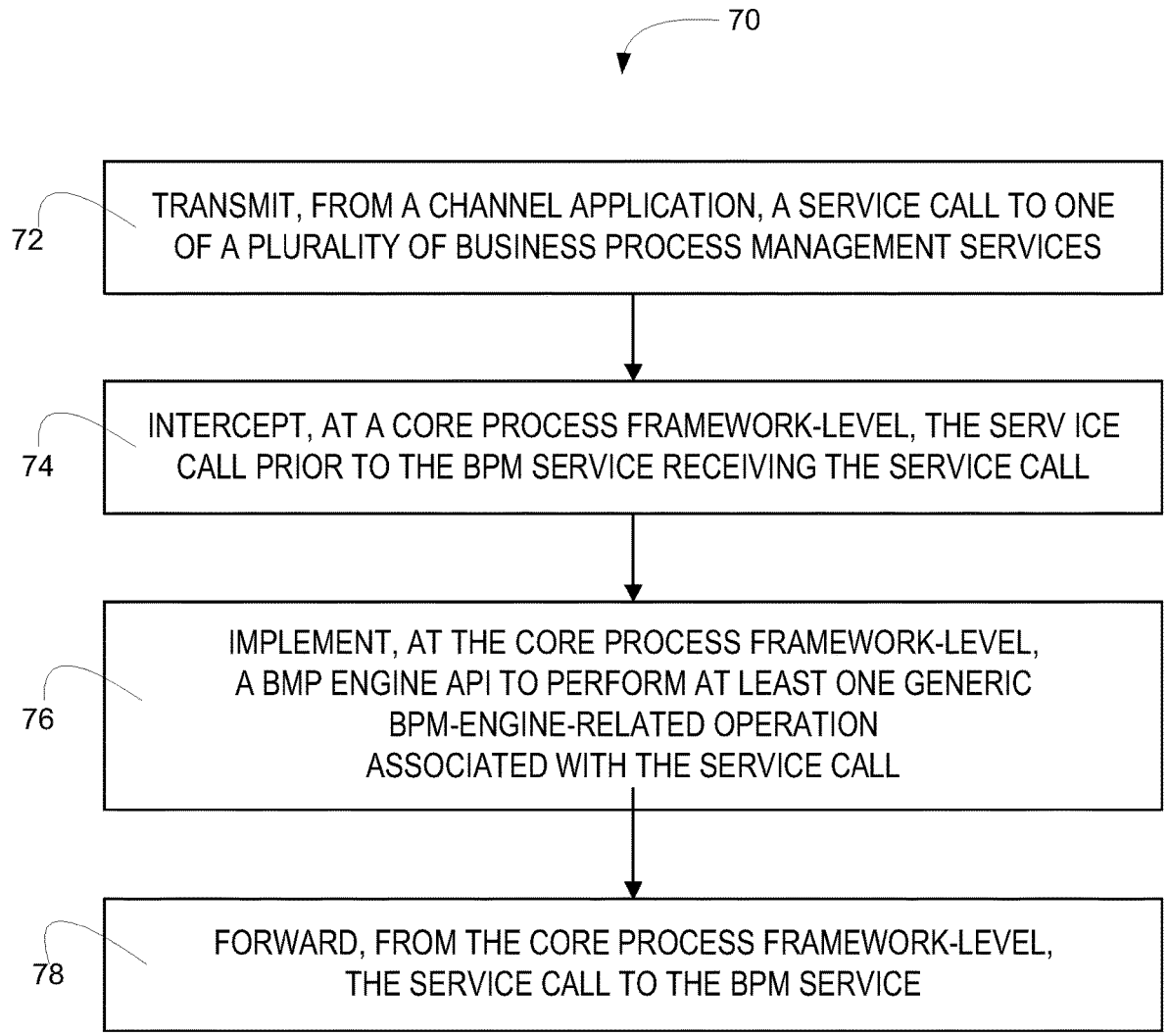
Figure 3:
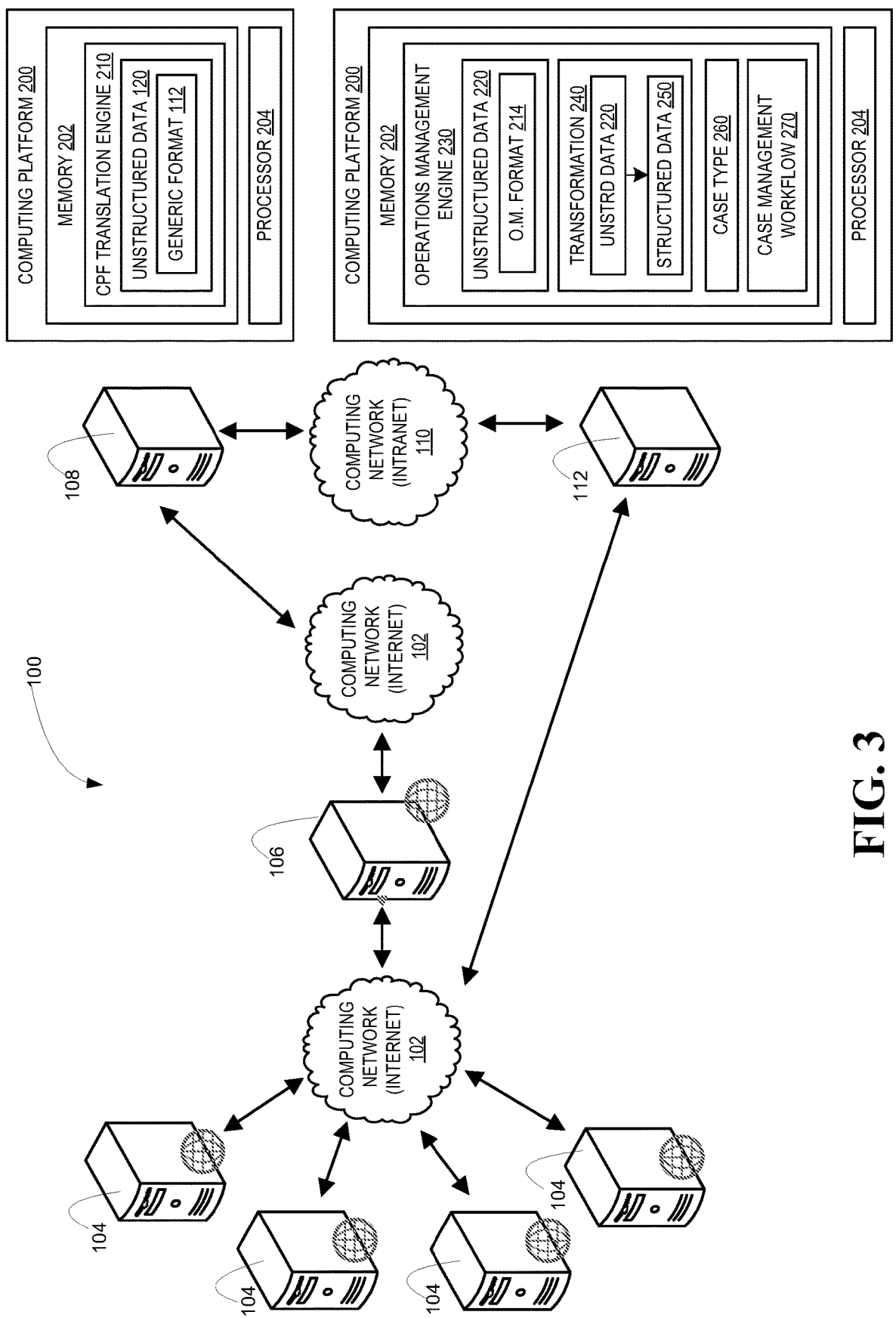
Figure 4:
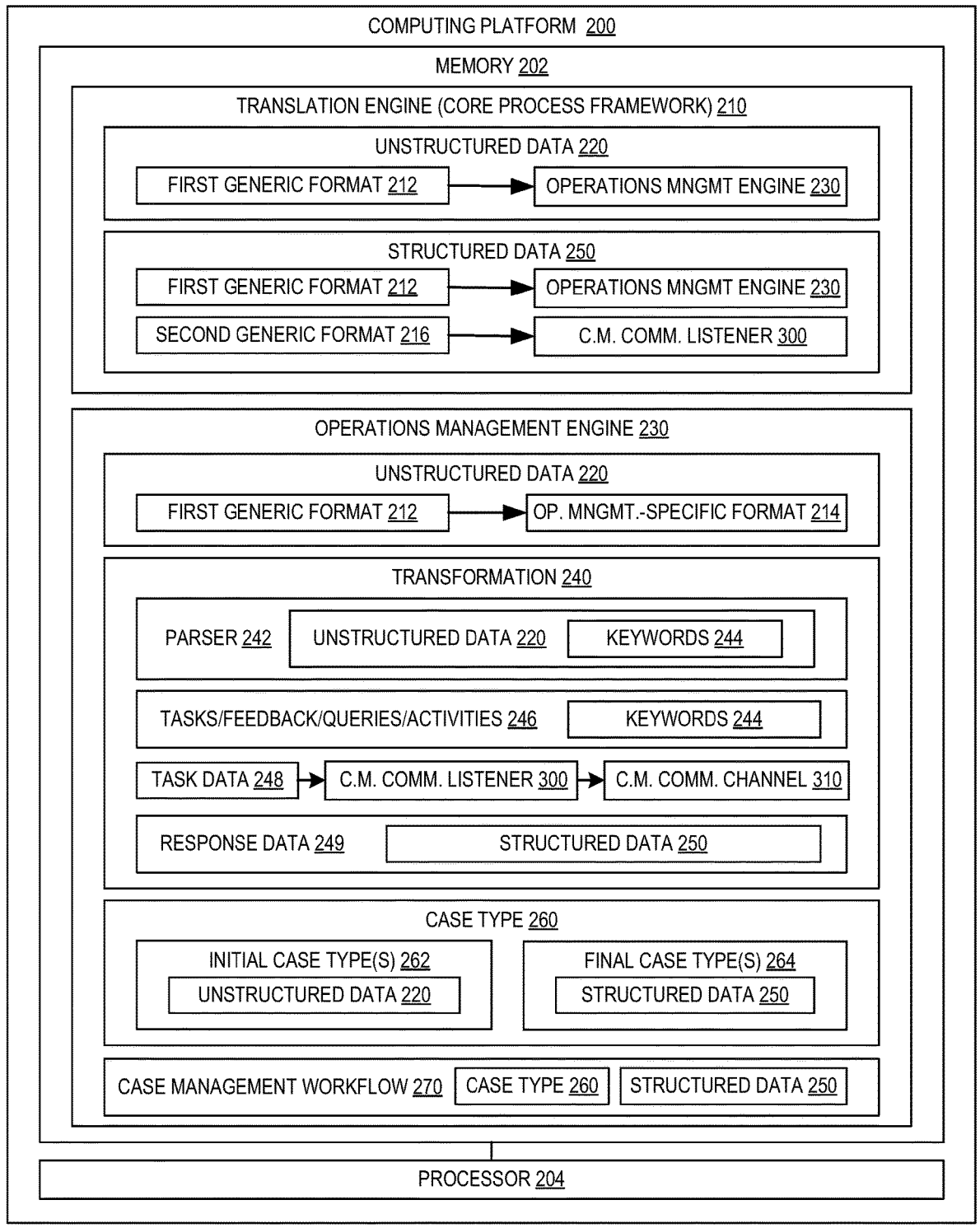
Figure 5:
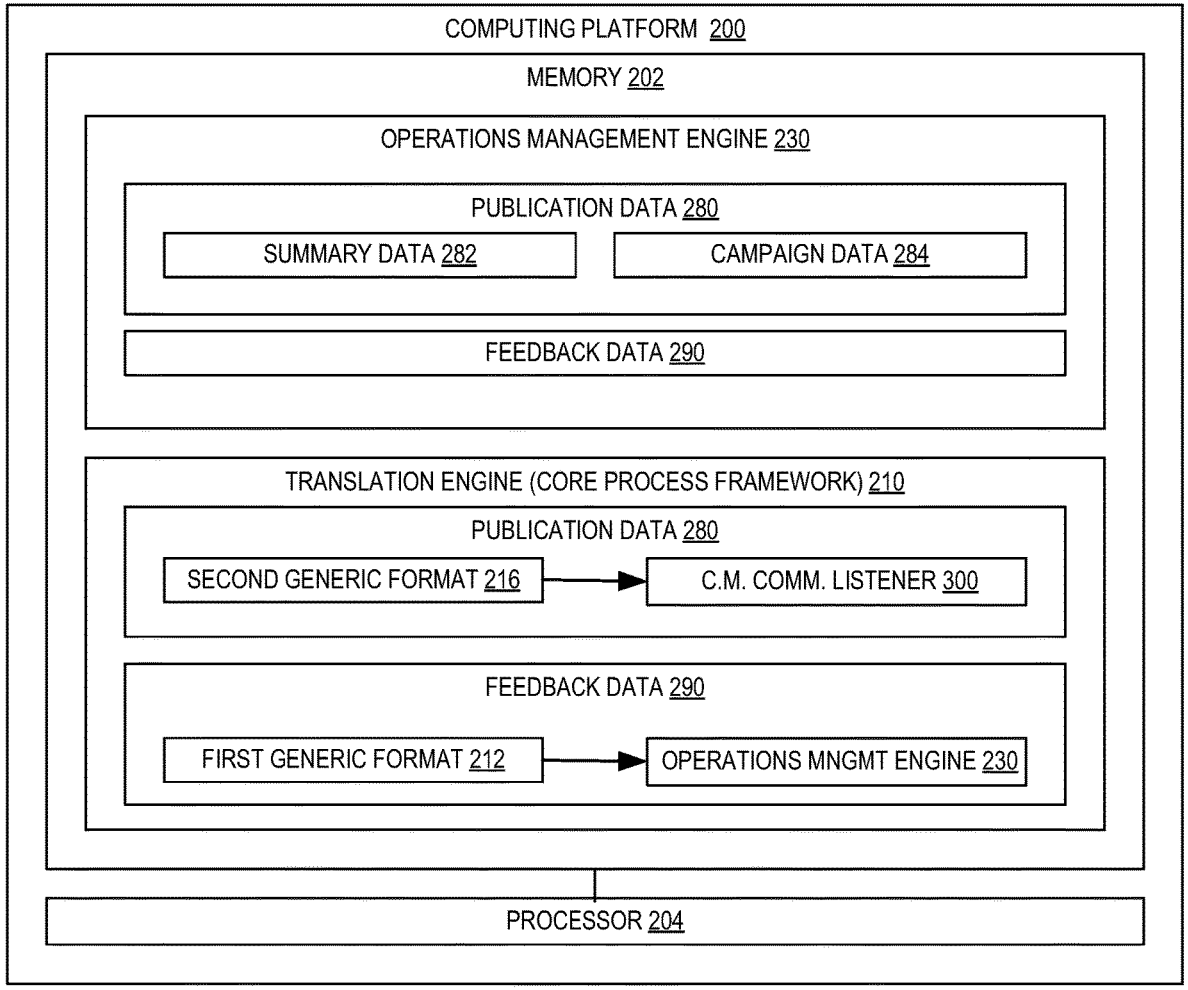
Figure 6:
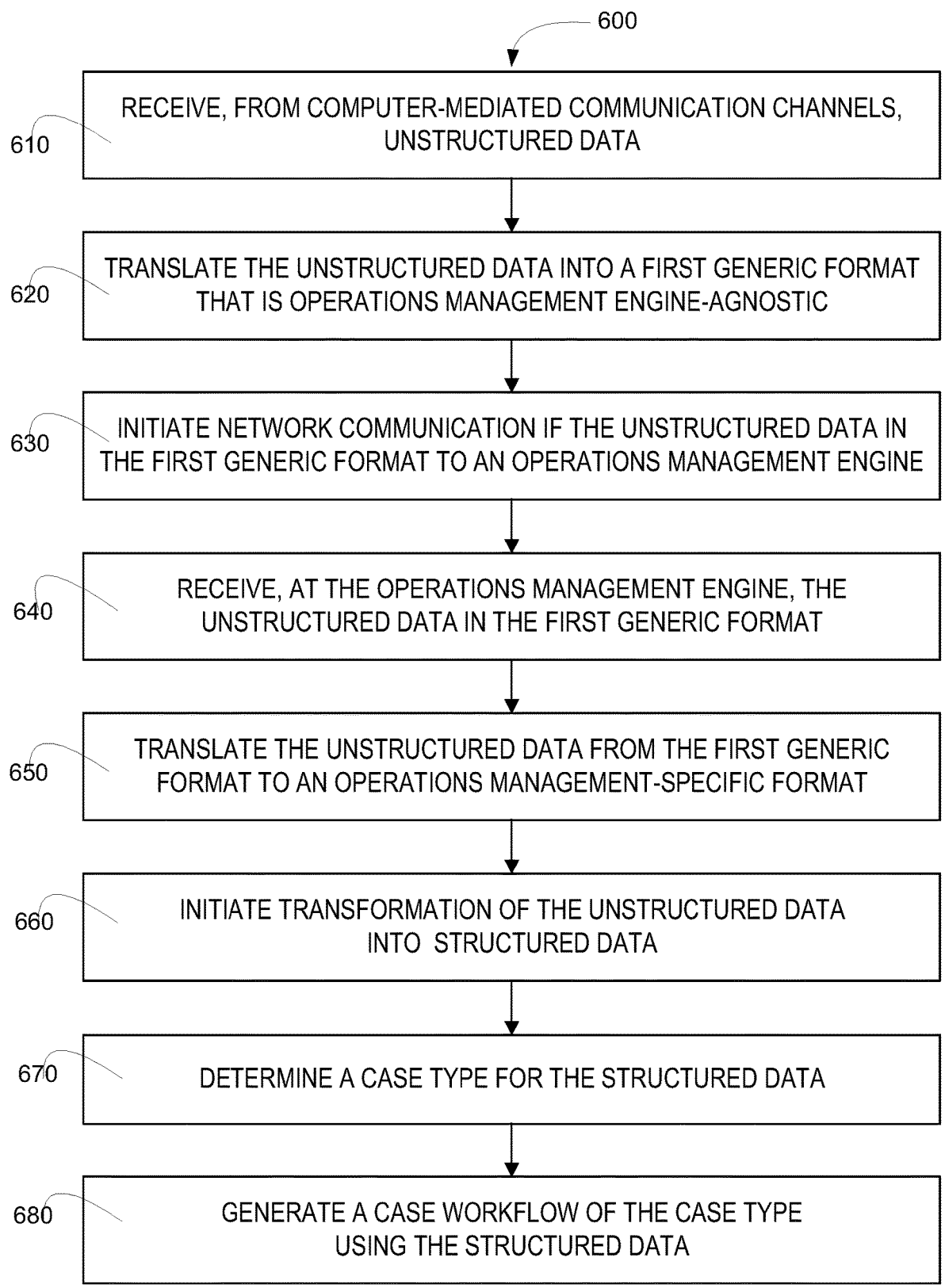
Figure 7:
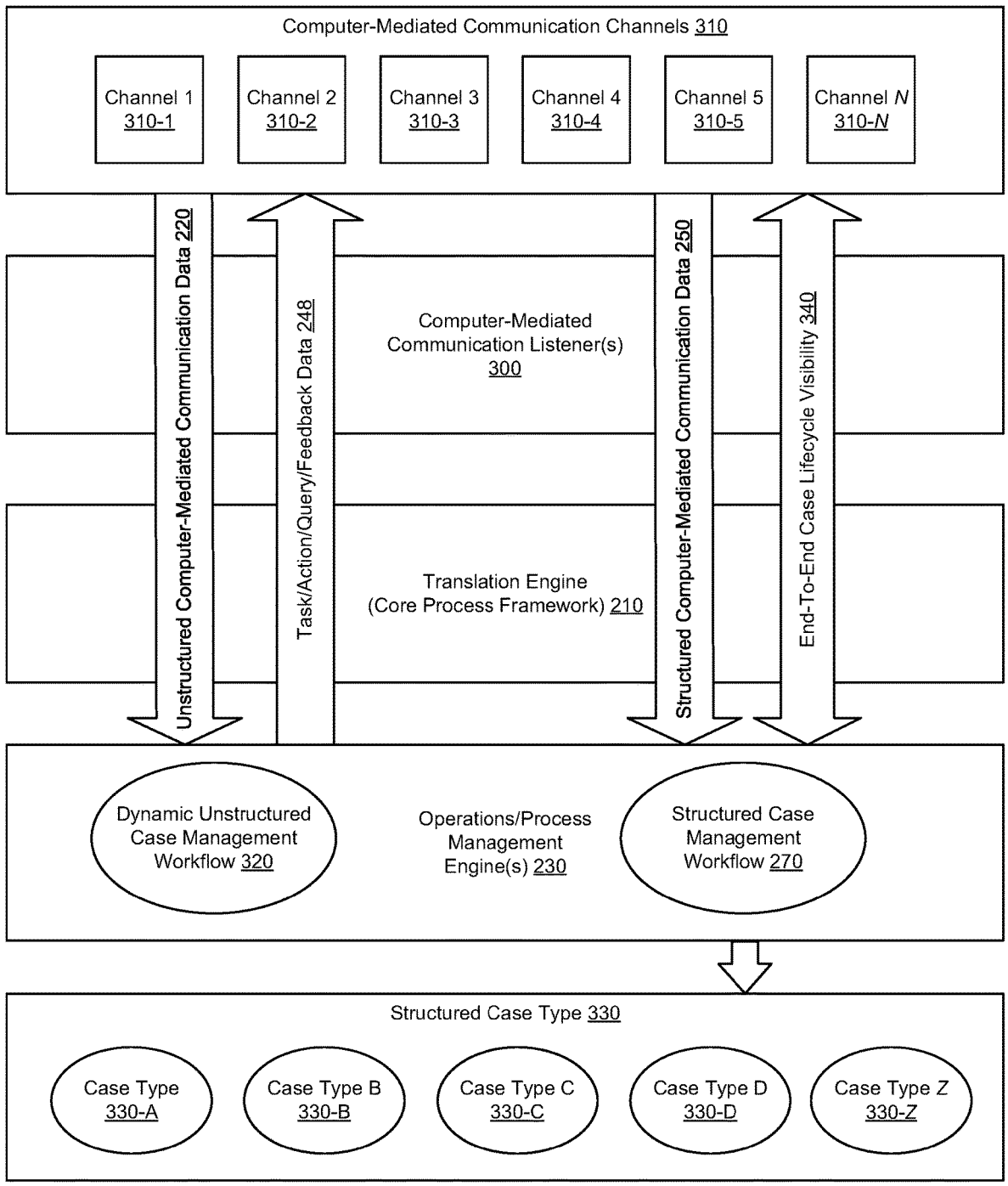

Having thus described embodiments of the invention in general terms, reference will now be made the accompanying drawings, wherein:

FIG. 1 provides a block diagram of a system of integrating disparate application through use a core process framework, in accordance with embodiments of the present invention;

FIG. 2 provides a flow diagram of a method for integrating channel applications with business process management services, in accordance with embodiments of the present invention;

FIG. 3 provides a schematic diagram of a system for structuring computer-mediated communication data, determining case/event-type for operations management and generating an applicable case-type specific workflow, in accordance with embodiments of the invention;

FIGS. 4 and 5 provide block diagrams of a computer platform for structuring computer-mediated communication data, determining case/event-type for operations management and generating an applicable case-type specific workflow, in accordance with embodiments of the invention;

FIG. 6 provides a flow diagram of a method for structuring computer-mediated communication data, determining case/event-type for operations management and generating an applicable case-type specific workflow, in accordance with embodiments of the invention;

FIG. 7 provides a block diagram of a system for structuring computer-mediated communication data, determining case/event-type for operations management and generating an applicable case-type specific workflow; and FIGS. 8-12 provide schematic diagrams of specific patterns for aligning computer-mediated communication with operations management, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, computer-mediated communication data, such as social media data is transformed from unstructured to structured data and, in response to such a transformation, relevant operations management case/event type(s) is determined and an applicable case type-specific workflow is generated for the case based on the structured data.

In specific embodiments of the invention, the transformation of the data from unstructured to structured occurs by parsing the unstructured data for keywords and identifying tasks, feedback, activities, queries or the like associated with the keywords, collectively referred to herein as an unstructured data case workflow. In response to identifying the workflow related to the unstructured data, task data is communicated back to the computer-mediated communication channels, typically via the related listeners and structured data responses are received.

In additional specific embodiments of the invention, data originating at various different computer-mediated communication channels is translated to a format that is operations management tool-agnostic (i.e., any of various different operations management engines, e.g., BPM engines). In addition, the present invention provides translating data originating at the various different operations management engines into a format that is computer-mediated communication channel-agnostic and/or listener-agnostic, such that, any different listener and/or channel can process the data originating at the various different operations management engines.

Moreover, embodiments of the present invention provide for determining one or more case/event types that are applicable to the computer-mediated communication data and generating one or more case-type specific structured workflows based on the transformed structured data.

Additionally, the present invention provides for systems, methods and the like for publishing data, such as summary data and campaign data to computer-mediated communication channels, such as social media channels and, in response to such publications, receiving feedback from the computer-mediated communication channels.

Referring to FIG. 1 a block diagram of a system 2 for seamlessly integrating channel applications 12 with business process management services 62 through the use of a core process framework 20. The system 2 is implemented in a distributed computing network 4, such as the Internet, one or more intranets or the like. The system includes a first computing platform 6 that is disposed in the distributed computing network 4 and includes a memory 8 and at least one processor 10 in communication with the memory 8. The first computing platform 6 may comprise a plurality of computing devices/apparatus, such as, but not limited to, multiple servers or the like capable of executing channel applications 12. As such, memory 8 and processors 10 may include multiple memory devices/units and processors configured throughout multiple different devices/apparatus. Channel applications 12 are stored in memory 8 and executable via processor 10. Channel applications may be any application associated with a communication channel of an enterprise that is configured, through the implementation of Application Programming Interfaces (APIs), to generate and initiate communication of service calls (as denoted by the arrows in FIG. 1) to Business Process Management (BPM) Services 62. The service calls are requests to the BPM services to perform an operation/workflow/service that is associated with the channel application 12.

The system 2 additionally includes a second computing platform 14 that is disposed in the distributed computing network 4 and includes a memory 16 and at least one processor 18 in communication with the memory 16. The second platform 14 may comprise a plurality of computing devices/apparatus, such as, but not limited to, an integration gateway or the like capable of executing core process framework 20, headless BPM 52 and core processing engine 54. As such, memory 16 and processors 18 may include multiple memory devices/units and processors configured throughout multiple different devices/apparatus. In addition, in some embodiments of the invention, the second computing platform 14 may overlap at least a portion of the first computing platform 6, in that, apparatus/devices that store and/or execute channel applications 12 may also store and/or execute at least a portion of the core process framework 20, headless BPM 52 and/or core process engine 54.

The core process framework 20, core process engine(s) 54 and headless BPM may comprise a Representational State Transfer (REST)-based service that is maintainable and scalable. In this regard, the core process framework 20 of the present invention is BPM service-agnostic (i.e., able to support any existing and future BPM services) and third-party entity/vendor-agnostic (i.e., able to support any existing (e.g., PEGA®, APPIAN®, ARTS® or the like) or future provider of BPM services regardless of computing platform/OS or the like)

The core process framework 20 is stored in the second memory, executable by the processor 18 and in communication with core processing engine(s) 54, such that the core process framework receives the service calls from the channel applications 12 while on route to the BPM services (i.e., intercepts the service calls, such through implementation if an integration gateway (not shown in FIG. 1) or the like disposed at the front-end of the BPM service 62). The core process engine 54 implements a BPM engine API 56 to perform at least one generic BPM engine-related operation 34 prior to forwarding the service call to the BPM service associated with the service call. In addition, the core process engine 54 may include one or more third-party entity engines 60-1, 60-2, such as a PEGA® engine, APPIAN® engine, ARTS® engine or the like configured to perform BPM service-specific operations.

In specific embodiments of the invention, the core process framework 20 implements the core process engine(s) 54 to execute one or more translation algorithms 50 to translate the service call from a channel application computing language to a computing language that is compatible with the associated BPM service and, in specific embodiments of the system, compatible with a user interface of the BPM service configured to display information associated with the service call.

In specific embodiments of the invention, the core process framework 20 relies on a plurality of middleware integration patterns 58 to perform BPM engine-related operations for the associated BPM service. For example, the middleware integration patterns 58 may be implemented to perform authentication/authorization 43. In additional specific embodiments, the core process framework implements headless business process management (BPM) 52 to execute process flows absent a Graphical User Interface (GUI). Use of a headless BPM 52 and middleware integration patterns provide for an open framework/architecture that provides high performance and limited dependency on the third-party entity/vendor that provides the BPM service.

The plurality of BPM services include, but are not limited to, (i) a case management service configured to manage incidents within an enterprise that are relegated to case status, (ii) a process analytics service configured to provide analytical data associated with enterprise processes, (iii) a mobile service configured to provide data in a mobile format for presentation on mobile platforms, and (iv) a social media service configured to communicate with social media listeners to receive enterprise-specific social media content and provide analytical data associated with the social media content. As such the core process framework 20 may include related BPM service APIs 22, such as social listener API 24, data analytics engine integration API 26, case management API 30 and mobile API 32. In addition, core process framework 20 may include other associated APIs, such as business data API 32, reporting servicing API 33 and the like.

In other specific embodiments of the system, the BPM-engine-related operations 34 include at least one of user entitlement 44, service call queue management 46 and service call routing 36, security 40 and the like. In other specific embodiments of the system, the core process framework 20 is configured to provide for standardized error processing and, in response to incurring an error, alert notification 42. In other embodiments of the system, the core process framework is configured to log 38 each action associated with the generic BPM engine-related operations and provide auditing 48 functionality through access to the log.

Referring to FIG. 2, a flow diagram is provided of a method 70 for integrating channel applications with BPM services through the use of a core processing framework/engine(s) that perform generic BPM engine-related operations for services calls made by the channel application to the BPM service, in accordance with embodiment of the present invention. At Event 72, a channel application transmits a service call to one of a plurality of BPM services. As previously discussed, the channel application may be any application associated with a communication channel that is configured to make service calls/requests to one or more BPM services. The BPM services may include, but are not limited to, (i) a case management service configured to manage incidents within an enterprise that are relegated to case status, (ii) a process analytics service configured to provide analytical data associated with enterprise processes, (iii) a mobile service configured to provide data in a mobile format for presentation on mobile platforms, and (iv) a social media service configured to communicate with social media listeners to receive enterprise-specific social media content and provide analytical data associated with the social media content. The BPM services may be provided through a vendor-specific BPM platform, such as PEGA®, APPIAN®, ARIS® or the like.

At Event 74, the service call is intercepted, by an integration gateway or the like executing a core process framework/engine(s), prior to the BPM service receiving the service call, and at Event 76, a BMP engine API is implemented to perform at least one generic BPM engine-related operation associated with the service call. As previously discussed, the generic BPM engine-related operation may include, but is not limited to, user entitlement, service call queue management, service call routing, security and the like. In addition, the core-processing framework/engine(s) may translate the service call from a channel application computing language to a computing language that is compatible with the associated BPM service and/or a UI associated with the BPM service.

Moreover, the core process framework/engines implement a plurality of middleware integration patterns to perform BPM engine-related operations for the associated BPM service, such as authentication and authorization or the like. In other related embodiments of the method, the core process framework/engine(s) may perform logging functions of all operations performed and provide for auditing functions based on access to the logs. In other specific embodiments of the method, the core processing framework/engine(s) may provide for standardized error reporting/alerting of errors occurring in operations performed by the core processing framework/engine(s).

At Event 78, in response to completion of the core processing, the service call is forwarded to the BPM service for workflow as dictated by the service call.

FIGS. 8-12 highlight specific embodiments of the invention, in which the core process framework is implemented in conjunction with a social BPM as a means of determining operation management case/event types and generating case-type specific workflows based on structuring data generated at social media entities.

Referring to FIG. 3 a schematic diagram is shown of a system 100 for structuring computer-mediated communication data, determining operation management case/event types and generating case type-specific workflow(s) based on the structured data, in accordance with embodiments of the present invention. The system 100 is operated within a distributed computing network that may include the Internet 102 and/or one or more intranet 110, cellular networks or the like. The system includes a plurality of web-based servers 104 that host computer-mediated communication channels, such as social media websites (e.g., FACEBOOK®, TWITTER®, INSTAGRAM®, PINTEREST®, TUMBLR®, LINKEDIN® and the like) or the like. The computer-mediated communication channel web-based servers 104 are in network communication (i.e., Internet 102) with one or more web-based servers 106 that host computer-mediated communication listener engines/tools that are configured to "listen" to the various different computer-mediated communication channels and mine data relevant to entities that subscribe to the listener. In this regard, the listener is configured to discern which computer-mediated communications, i.e., social media posts are relevant or otherwise of interest to an entity, such as a business or the like based on predefined parameters (e.g., search criteria) provided to by the entity.

The computer mediated communication listener web-based server(s) 106 is in network communication (i.e., Internet 102) with server 108 associated with an entity, such as business entity implementing the herein disclosed invention. One of ordinary skill in the art will recognize that requisite firewalls and gateway devices may be disposed between the computer mediated communication listener web-based server(s) 106 and server 108. Server 108 includes computing platform 100 having a memory 102 and at least one processor/processing device 104 in communication with the memory 102. The memory 102 stores translation engine 110, otherwise referred to herein as core process framework, which is executable by the processor 104 and configured to receive, from the computer-mediated communication listener web-based server(s) 106, unstructured data 120, in the form of a raw data feed of the computer-mediated communication data (e.g., the social media posts and related metadata) and, implementing an Applications Programming Interface (API) to translate the unstructured data 120 into a generic format 112 that is operations management engine-agnostic (i.e., capable of being processed by any operations management engine, e.g., Business Process Management (BPM) engines). In large entities, numerous disparate BPM engines may implement to manage operations/processes and each BPM engine may require data in a specific format for processing purposes. Similarly, as will be discussed infra., the translation engine 110 additionally provides for translating data received from the operations management engines into a generic format that is computer-mediated communication listener-agnostic (capable of being processed by any computer-mediated communication listener).

Server 108 is in network communication (i.e., intranet 110) with one or more servers 114, which additionally includes computing platform 100 having a memory 202 and at least one processor/processing device 204 in communication with the memory 202. The memory 202 stores operations management engine 230 that is executable by processor 204. It should be noted that in other embodiments of system 100 and other embodiments of the invention, the translation engine 210 stored in server 108 and the operations management engine(s) 230 stored in server(s) 114 may be stored and executed in more than two servers or applicable computing devices or in one single server or any other applicable computing device. Operations management engine 230, otherwise referred to herein as Business Process Management (BPM) engine, is configured to receive the unstructured data 220 in the generic format 212 and translate the unstructured data 220 from the generic format 212 to an operations management engine-specific format 214.

Additionally, operations management engine(s) 230 is configured to initiate transformation 240 of the unstructured data 220 into structured data 250. As will be discussed in more detail infra., in specific embodiments of the invention, such transformation 240 includes parsing the unstructured data for keywords and determining an unstructured case workflow based on the keywords. The unstructured case workflow may include identifying tasks, activities, queries, feedback and the like, communicating data related to such to the computer-mediated communication channels and receiving, in response responses/feedback that are in requisite structured format. Additionally, operations management engine(s) 230 is configured to determine one or more case types 260 based on the structured data and generate a structured case-type specific workflow(s) 270 for the applicable cases implementing the structured data 150.

Referring to FIGS. 4 and 5 a detailed block diagram of the computing platform 100 is depicted, in accordance with embodiments of the present invention. In addition to providing more details for the system and process, FIGS. 4 and 5 provide various optional embodiments of the system. As previously discussed, the computing platform 200, which may comprise one or more apparatus, devices or the like is configured to execute translation engine 210 and operations management engine(s) 230 (i.e., algorithms, such as applications, modules, routines, and the like. Computing platform 200 includes memory 202, which stores the engines 210 and 230 thereon. The memory 202 may comprise volatile and non-volatile memory, such as read-only and/or random-access memory (RAM and ROM), EPROM, EEPROM, flash cards, or any memory common to computer platforms). Moreover, memory 202 may comprise cloud storage, such as provided by a cloud storage service and/or a cloud connection service.

Further, computing platform 200 also includes one or more processors 204, which may be application-specific integrated circuits ("ASICs"), or other chipsets, logic circuits, or other data processing device(s). Processor 204 may execute an application programming interface ("API") (not shown in FIGS. 4 and 5) that interfaces with any resident programs (i.e., translation engine 210 and/or operations management engine 230) stored in the memory 202 of the computing platform 200.

Processor 204 may include various processing subsystems (not shown in FIGS. 4 and 5) embodied in hardware, firmware, software, and combinations thereof, that enable the functionality of the computing platform 200 and the operability of the computing platform 200 on the distributed computing network 102 and 110 (shown in FIG. 3). For example, processing subsystems allow for initiating and maintaining communications and exchanging data with other networked devices, such as web-based servers 104 and 106 (shown in FIG. 3). For the disclosed aspects, processing subsystems of processor 204 may include any subsystem used in conjunction with translation engine 210 and operations management engine(s) 230 and related, codes, routines, sub-routines, algorithms, sub-algorithms, modules, sub-modules thereof.

Computer platform 214 may additionally include a communications module (not shown in FIG. 3) embodied in hardware, firmware, software, and combinations thereof, that enables electronic communications between the computing platform 200 and other platforms, apparatus and/or devices, such as computer resources 104 and server 106 (shown in FIG. 3). Thus, communication module may include the requisite hardware, firmware, software and/or combinations thereof for establishing and maintaining a network communication connection.

Further, processor 204 is configured to execute translation engine 210, also referred to herein as core process framework, that is configured to receive unstructured data 220 or structured data 250 from the computer-mediated communication listener and/or, in some embodiments, directly from the computer-mediated communication channels (e.g., social media channels) and translate the data into a first generic format 212 that is operations management engine-agnostic (i.e., capable of being processed by any operations management engine that receives the unstructured data 220 or the structured data 250). Additionally, translation engine 210 is configured to receive structured data 250 (task data 248 including tasks, activities, queries, feedback and the like) from the operations management engines 230 and translate the data into a second generic format 216 that is computer-mediated communication listener-agnostic (i.e., capable of being processed by any computer-mediated communication listener that receives the structured data 250).

Processor 204 is further configured to execute operations management engine(s) 230, otherwise referred to herein as Business Process Management (BPM) engines. The engines are configured to receive, from the translation engine 210, the unstructured data 220 in the first generic format 212 and translates the unstructured data 220 to an operations management engine-specific format 230 for further processing.

In addition, operations management engine(s) 230 is configured to initiate transformation 240 of the unstructured data 220 to structured data 250 for the purpose of determining case type 260 and subsequently generating a case-type specific workflow 270. In specific embodiments of the invention, the transformation 240 includes implementing parser 242 that is configured to parse the unstructured data 220 for keywords 244 (i.e., words or phrases). The keywords 244 are used to identify tasks 246, activities, queries, feedback or the like associated with the data (i.e., a computer-mediated communication event, such as a social media posting or the like). In addition, in specific embodiments of the invention, the keywords 244 in the unstructured data 220 may be used to identify one or more initial case types 262.

Identification of initial case types 262 may be instrumental in identifying tasks 246, activities, queries, feedback or the like associated with the computer-mediated communication event.

In response to identifying tasks 246, activities, queries, feedback or the like, the operations management engine 230 is further configured to initiate communication of task data 248 (i.e., data associated with the tasks 246, activities, queries, feedback or the like) to the computer-mediated communication listener 300, which in turn sends the task data 248 to the computer-mediated communication channels 310. In other embodiments of the invention, in which translation is not required, the task data 248 may be directly communicated to one or more computer-mediated communication channels 310.

In response to communication of the task data 248, the operations management engine 230 is configured to receive response data 249 from the computer-mediated channels that is in a structured format 250. In those embodiments in which the response data is received from the computer-mediated communication listeners 300 in first generic format 212, the operations management engine 230 may be further configured to translates the structured data 250 on an operations management engine-specific format 214 for further processing. The operations management engine 230 is configured to rely on the structured data 250 to determine one or more case types 260 associated with the structured data 250. In a large entity/enterprise, various different case types exist. Each case type signifies a different process that is required to address the event(s) associated with the case. For example, in a financial institution case types may include, but are not limited to, service requests, claims requests, complaints, transaction cancellation, account opening/closing, card replacement, misappropriation and the like. In specific embodiments of the invention, in which an initial case type(s) 262 is determined upon receipt of the unstructured data 220, the case type(s) that is determined upon receipt of the structured data 250 is defined as the final case type(s) 264. The final case type(s) 264 may be the same case types as the initial case type(s) or one or more of the final case type(s) 264 may be different from one or more of the initial case type(s) 262.

In response to determining the case type(s) 260, case type-specific management workflow(s) 270 are generated based on and/or including the structured data 250.

Referring to FIG. 5, in other embodiments of the invention, the operations management engine 230 may be configured to generate publication data 280 for publication on one or more computer-mediated communication channels 310. For example, in a large entity/enterprise, such as a financial institution or the like, the entity may generate summary data 282 and/or campaign data 284 for publication on one or more computer-mediated communication channels. Summary data 282 may be data associated with an individual or a group of individuals within the entity that offer a service or the like. Such summary data 282 may be published on a business-oriented social networking service or the like. Campaign data 284 may be data associated with a service or product that the entity is promoting, for example, within a financial institution embodiment, the campaign may to be promote new customers or the like. In response to publishing such data, the operations management engine 1230 is configured to receive feedback 290. Feedback data may include, but is not limited, messages associated with the individuals or group of individuals connected with summary data 282, orders/applications for a product, service, new customer or the like.

In specific embodiments of the invention in which the publication data 280 is communicated to the computer-mediated communications channels 310 via a computer-mediated communication listener 200, the operations management engine 230 is configured to communicate the publication data 280 to the translation engine 210 this configured to translate the publication data 280 to a second generic format 216 that is computer-mediated communication listener-agnostic (i.e., capable of being processed by any computer-mediated communication listener that receives the publication data 280). Moreover, in those embodiments of the invention in which the feedback data 290 is communicated to the operations management engine 230 via a computer-mediated communication listener 300, the listener(s) is configured to communicate the feedback data 290 to the translation engine 210 this configured to translate the feedback data 290 to a first generic format 212 that is operations management engine-agnostic (i.e., capable of being processed by any operations management engine that receives the feedback data 290).

Referring to FIG. 6, a flow diagram is presented of a method 600 for structuring computer-mediated communication data, determining case type(s) and generating case-type specific workflows, in accordance with embodiments of the present invention. At Event 610, unstructured computer-mediated communication data is received from one or more computer-mediated communication channels. The computer-mediated communication data may be a raw data feed of data associated with social media posts that are relevant to an associated entity/business. In specific embodiments of the method, the computer-mediated communication data is received indirectly from the one or more computer-mediated communication channels via a computer-mediated communication listener. As previously discussed, the computer-mediated communication listener is a service employed by the entity/business to identify/filter computer-mediated communication (e.g., social media communication) relevant to the entity/business.

At Event 620, the unstructured is translated into a first generic format that is operations management engine-agnostic (i.e., capable of being processed by any operations management/BPM engine that receives the unstructured data) and, at Event 630, communication of the unstructured data in the first generic format is initiated to one or more operations management engines.

At Event 640, the unstructured data in the first generic format is received by the one or more operations management engines and, at Event 650, the unstructured data is translated from the first generic format to an operations management-specific format.

At Event 660, transformation of the unstructured data to structured data is initiated. In specific embodiments of the method, such transformation includes parsing the unstructured data for keywords/phrases, identifying tasks, activities, queries, feedback and the like based on the keywords/phrases, communicating task data (including tasks, activities, queries, feedback) to the computer-mediated communication channels (typically via the listener) and, in response to communicating the task data, receiving, from the channels, results data that is in structured format.

At Event 670, in response to receiving the structured data, one or more case types are identified based on the responses in the structured data. As previously discussed, in a large entity/enterprise, various different case types exist. Each case type signifies a different process that is required to address the event(s) associated with the case. At Event 680, one or more case type-specific workflows are generated and initiated using the structured data.

Referring to FIG. 7 a schematic diagram is presented of a system for structuring computer-mediated communication data, determining case type(s) for the structured data and generating case type-specific workflows, in accordance with embodiments of the present invention. The system includes computer-mediated communication channels 310, e.g., social media websites and the like. Each of computer-mediated communication channels 30-1-310-N is configured to generate computer-mediated communication (e.g., social media postings and the like). The unstructured computer-mediated communication data 320 is communicated indirectly to an entity of interest (i.e., a business or other entity to which the computer-mediated communication data is relevant) via a computer-mediated communication listener 300, e.g., a social media listener service that is responsible for "listening" to various different social media channels are identifying/"mine" those communications (e.g., posting events, messages and the like) which are relevant to the entity based on the entity's predetermined relevancy criteria.

In turn the computer-mediated communication listener 300 communicates the unstructured data feed containing the entity-relevant communication data to a translation engine 110, otherwise referred to herein an core process framework, that is configured to translate the unstructured data to a generic format that is operations management engine-agnostic. Subsequently, the translation engine 210 communicates the unstructured data 220 to the operations management/BPM 230 engine. The operations management engine 230 is configured to translate the generic format to an operations management-specific format and initiate transformation of the unstructured data 220 to structured data 250. In this regard, the operations management engine 230 is configured to generate a dynamic unstructured case management workflow 320. The workflow 320 is generated by parsing the unstructured data 220 to identify keywords/phrases and using the keywords/phrases to identify tasks, activities, queries, feedback and the like associated with the keywords/phrases.

In response to such identification, the task/activity/query/feedback data 248 is communicated back to the computer-mediated communication channels 310. In the illustrated embodiments of FIG. 6, the task data 248 is communicated to the translation engine 210 where it is translated into a generic format that is computer-mediated communication listener-agnostic. In turn, the translation engine 210 communicates the task data 248 to the computer-mediated communication listener 300, which translates the task data 248 from the generic format to a listener-specific format. The computer-mediated communication listener 300 is configured to communicate the task data 248 to the applicable computer-mediated communication channels 2310. It should be noted that the computer-mediated communication channel 310 that generated the initial computer-mediated communication data/event may be the same channel or a different channel to which the task data 248 is communicated.

In response to receiving the task data 248 that includes tasks, actions, queries and the like, the computer-mediated communication channel(s) 310 is directed to perform the associated tasks, actions, queries and the like, which may entail accessing requisite databases to retrieved information or contacting a user that generated the initial computer-mediated communication (e.g., social media posting) to obtain further information. The user may be contacted using the computer-mediated communication channel 310 (i.e., social media postings), via an associated messenger service or via a user-specified communication channel (e.g., text/SMS, voice or the like).

As a result of communicating the task data 248 to the computer-mediated communications channels 310 and obtaining information, response data is communicated back to the operations management engine 230 as structured data 250. In specific embodiments of the invention, the structured response data 150 is communicated indirectly via the computer-mediated communication listener 300. In turn the computer-mediated communication listener 200 communicates the structured data to the translation engine 210 that is configured to translate the structured data to a generic format that is operations management engine-agnostic. Subsequently, the translation engine 210 communicates the structured data 250 to the operations management/BPM 230 engine. The operations management engine 230 is configured to translate the generic format to an operations management-specific format.

In response to receiving the response data in structured format, the operations management engine 230 determines one or more case types 330-A-330-Z associated with the structured data and generates a structured case type-specific management workflow 270 for the structured data. In addition, the operations management workflow provides for end-to-end case lifecycle visibility 340 to the one or more computer-mediated communication channels 310, in which feedback may be provided to the channels at any point in the lifecycle of the assigned case.

Referring to FIGS. 8-12, shown are schematic diagrams of specific patterns for aligning computer-mediated communication with operations management processing, in accordance with embodiments of the present invention. The patterns herein shown and described are drawn to three different types of computer-mediated communication (e.g., social media content):

(1) Created content is content that is generated by an entity (e.g., business or the like) and published to computer-mediated channels (e.g., social media websites). In response to publishing the content, the computer-mediated channels provide structured feedback to the entity resulting in round-trip actions and structured case management workflows.

(2) Earned Content is content generated/posted on the computer-mediated communication channels by users (e.g., social media posters) that is monitored or crowd-sources. The data that is collected and communicated to the entity of interest is unstructured data that results in a dynamic unstructured case management workflow. Round Trip actions and further information provided from the users results in structured data being communicated to the entity of interest.

(3) Targeted Content is content directly targeted to a user of the computer-mediated communication channel, e.g., communicating messages to the user via a channel-associated messaging service or the like and receiving responses from the users, resulting in end-to-end structured case management workflows.

Figure 8:
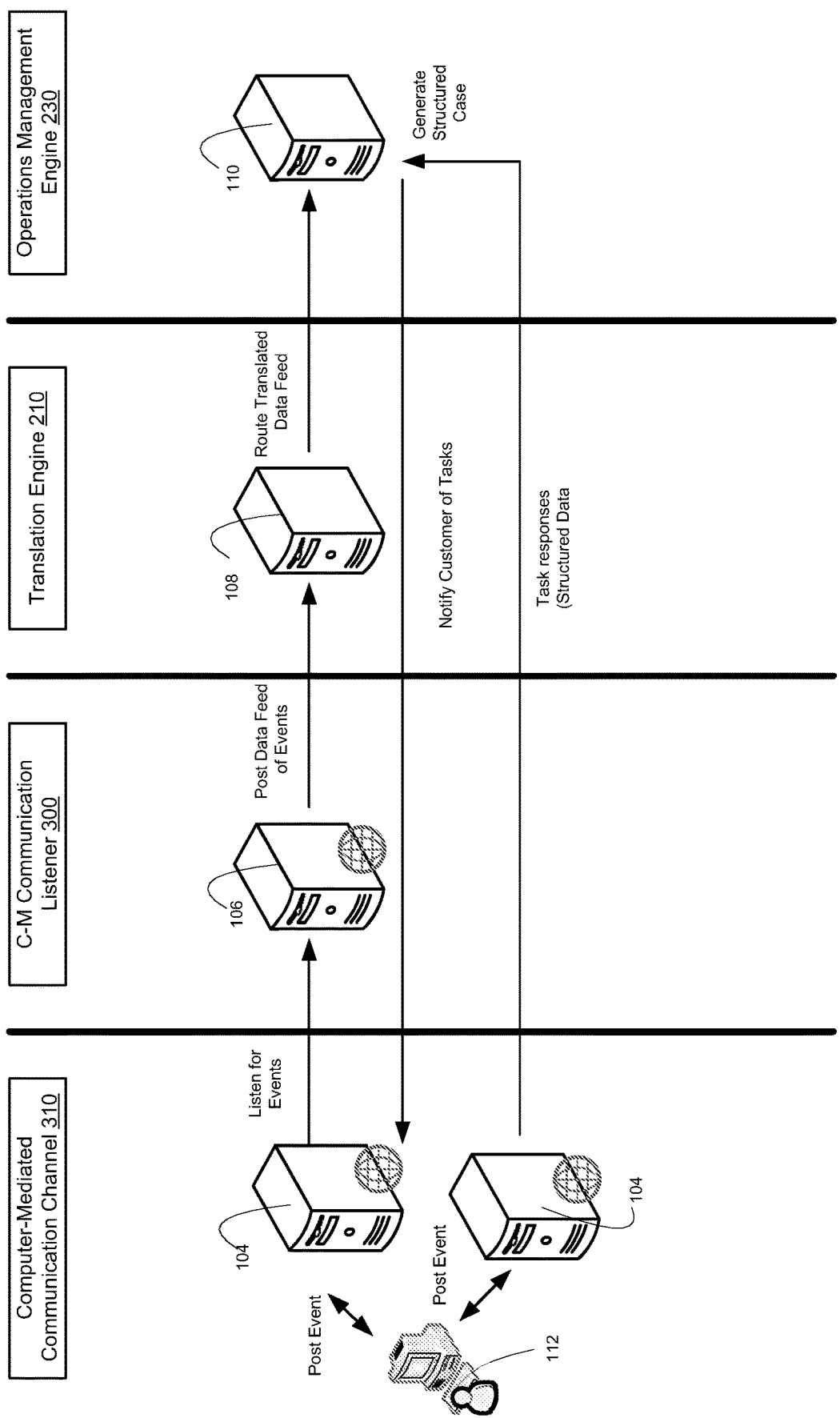

Referring to FIG. 8 a schematic diagram is shown of a use pattern for earned content in which a user generates/posts information relevant to the entity such as a compliant about the entity or a request for service, in accordance with embodiments of the present invention. In the complaint pattern, the complaint poses reputational risk to the entity and may create negative news about the entity. Therefore, the entity has a need to identify such events/postings and implement requisite corrective actions. In the service request pattern, the user posts a need for a service that the entity provides (with or without identifying the entity), as such a need exists to identify such events/posting and implement a process to streamline and classify these adhoc unstructured service requests. The user 112 posts an event to the computer-mediated communication channel 310. The event may be a compliant related to the entity or a generic request for a service provided by the entity.

The computer-mediated communication listener 300 is in communication with the various different web-based servers 104 associated with the channels 310 and listens for and collects/mines data associated with the events (i.e., user postings). Once data related to the event is mined by the computer-related communication listener 300, web-based server 106 posts a data feed of the events which is received by the translation engine 210 of server 108. As previously discussed, the translation engine provides an API to integrate any operations management engine 230 irrespective of its language/configurations to the computer-mediated communication listener 300. The translation engine provides the further benefit of isolating the operations management engine(s) 230 from the computer-mediated communication listeners, thus providing added security. Once the unstructured data has been translated to a generic format, the translated data feed of the unstructured data is communicated by server 108 to server 110, which executes the operations management engine 130.

The operations management engine 230 is configured to convert/transform the unstructured data to structured data. Specifically, through parsing the unstructured data to identify keywords and the like, the operations management engine 230 is configured to identify tasks including actions, queries, feedback or the like for the computer-mediated communication channels. Task data is communicated to the user/poster via the computer-mediated communication channels and, in response to the user/poster replying to the tasks, task response data, in a structured format is communicated back to the operations management engine 130. In turn, the operations management engine is configured to identify one or more case types based on structured data available and applicable business rules and create a case type-specific structured workflow which is subsequently processed (i.e., issue resolution and/or providing requisite service). In addition, the operations management engine 230 provides for end-to-end case lifecycle visibility, via the computer-mediated communication channels, to the user/poster as it is being processed/resolved.

Figure 9:
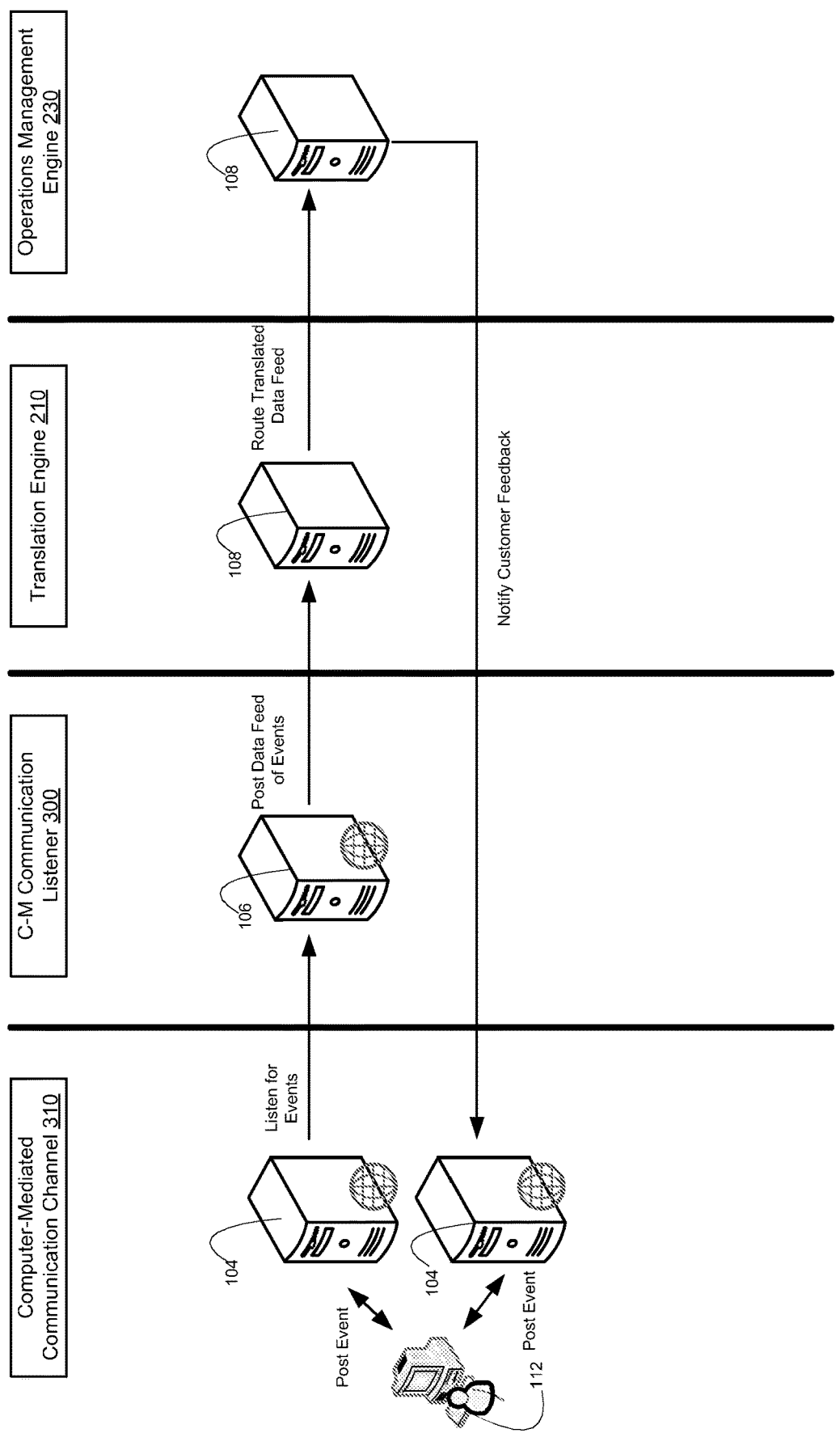

Referring to FIG. 9 a schematic diagram is shown of a use pattern for earned content in which a user generates/posts information about misappropriation occurring at the entity or otherwise affecting the entity. Therefore, there is a need by the entity to identify such events/postings and implement an operations management workflow that addresses the misappropriation.

The user 112 posts an event to the computer-mediated communication channel 310. The event may be associated with a misappropriation that they are aware of that has occurred at the entity, a related entity or may otherwise affect the entity. The computer-mediated communication listener 300 is in communication with the various different web-based servers 104 associated with the channels 310 and listens for and collects/mines data associated with the events (i.e., user postings). Once data related to the event is mined by the computer-related communication listener 300, web-based server 106 posts a data feed of the events which is received by the translation engine 210 of server 50. As previously discussed, the translation engine provides an API to integrate any operations management engine 230 irrespective of its language/configurations to the computer-mediated communication listener 300. The translation engine provides the further benefit of isolating the operations management engine(s) 230 from the computer-mediated communication listeners, thus providing added security. Once the unstructured data has been translated to a generic format, the translated data feed of the unstructured data is communicated by server 108 to server 110, which executes the operations management engine 230.

In specific embodiments of the invention such as shown in FIG. 8, the operations management engine 230 is configured to convert/transform the unstructured data to structured data. Specifically, through parsing the unstructured data to identify keywords and the like, the operations management engine 230 is configured to identify tasks including actions, queries, feedback or the like for the computer-mediated communication channels. Task data is communicated to the user/poster via the computer-mediated communication channels and, in response to the user/poster replying to the tasks, task response data, in a structured format is communicated back to the operations management engine 230. In other embodiments of the invention, such as shown in FIG. 9, the operations management engine 130 is configured to parsing the unstructured data to identify keywords and the like, the operations management engine 230 is configured to identify the requisite case type(s) and determine the case type-specific structured workflows. In such embodiments of the invention, notification/feedback as the case being created may be provided to the user/poster via the one or more computer-mediated communication channels 310. In addition, the operations management engine 230 provides for end-to-end case lifecycle visibility, via the computer-mediated communication channels. to the user/poster of the case as it is being processed/resolved.

Figure 10:
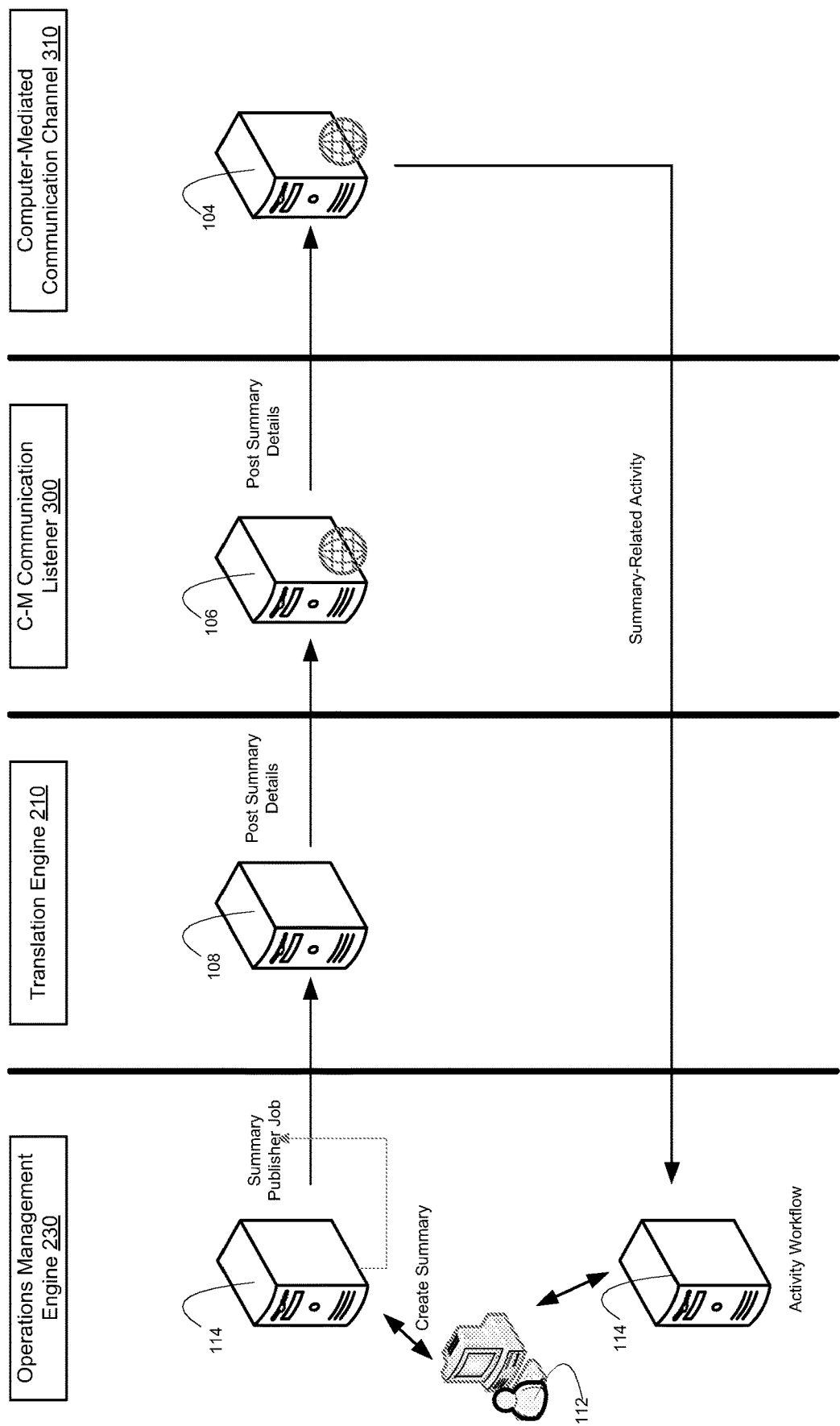

Referring to FIG. 10 a schematic diagram is shown of a use pattern for creating content, in which summaries are published to computer-mediated communication channels 310, in accordance with embodiments of the present invention. The user 112 creates a summary, which is associated with an individual or a group of individuals within the entity. By publishing the summary on one or more computer-mediated communication channels the individual or group of individuals gain exposure through a social presence, exchange of ideas, information and the like. Once the summary has been created and is received by the operations management engine 130, a requisite approval process is executed, to ensure compliance to regulations and internal communication rules/guidelines. In response to approval, a summary publisher job is executed by the operations management engine 230, which serves to communicate the summary to the translation engine 230.

The translation engine 230 is configured to translate the summary data into a generic format that is computer-mediated communication listener-agnostic and, in response, post summary details to a computer-mediated communications listener 300. The computer-mediated communications listener 300 is configured to, via an API, translate the generic format to a listener-specific format, and, subsequently communicate details of the summary to one or more designated computer-mediated communications channels 310. In addition, the translation engine provides complete security isolation between the computer-mediated communication listeners and the operations management engines. In response to channel users interacting with the summary, summary-related activities may be communicated back to the entity. For example, in the event that channel user responds to a summary by requesting a service (e.g., opening an account or the like) a service request may be generated and sent to an applicable operations management engine 214, which generates a structured case workflow for the service request (e.g., a case for opening an account or the like). In addition, the operations management engine 230 provides for end-to-end case lifecycle visibility, via the computer-mediated communication channels, to the channel user/summary activity provider as the service request or the like is being processed/resolved.

Figure 11:
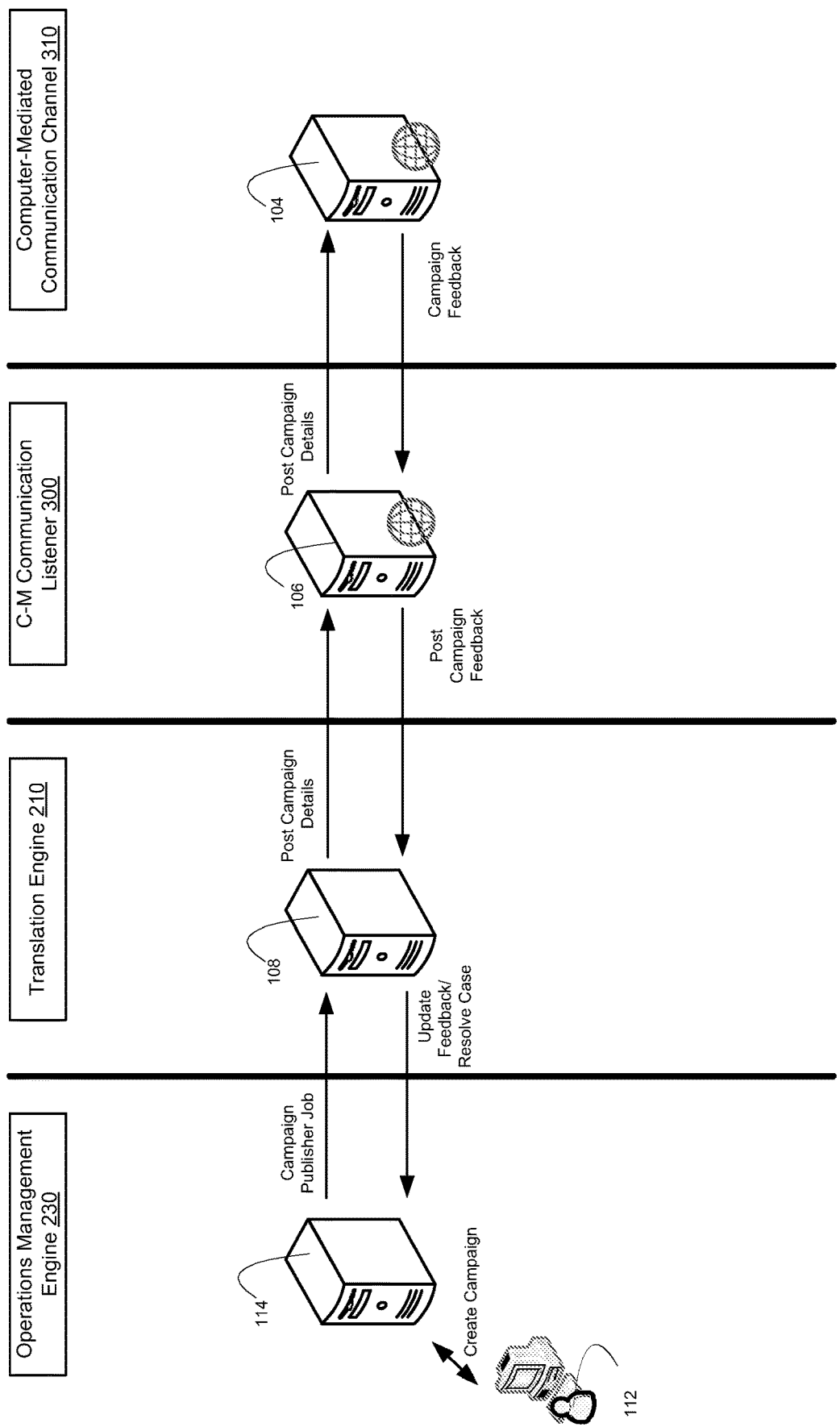

Referring to FIG. 11 a schematic diagram is shown of a use pattern for created content, in which campaigns are published to computer-mediated communication channels 310, in accordance with embodiments of the present invention. The user 112 creates a campaign to gain exposure through a social presence, exchange of ideas, and obtain feedback and the like. Once the campaign has been created and is received by the operations management engine 230, a requisite approval process is executed, to ensure compliance to regulations and internal communication rules/guidelines. In response to approval, a campaign publisher job is executed by the operations management engine 230, which serves to communicate the campaign to the translation engine 230.

The translation engine 230 is configured to translate the campaign data into a generic format that is computer-mediated communication listener-agnostic and, in response, post campaign details to a computer-mediated communications listener 300. The computer-mediated communications listener 300 is configured to, via an API, translate the generic format to a listener-specific format, and, subsequently communicate details of the campaign to one or more designated computer-mediated communications channels 310. In addition, the translation engine 130 provides complete security isolation between the computer-mediated communication listeners 300 and the operations management engines 230. In response to channel users interacting with the campaign, campaign-related feedback may be communicated back to the entity.

In this regard, the feedback data may be listened for and mined by the computer-mediated communication listeners 300, which, in turn, posts details of the feedback to the translation engine 210. The translation engine 210 is configured to translate the feedback data to a generic format that is operations management engine-agnostic. As previously discussed, the translation engine 210 additionally provides secure isolation between the computer-mediated communication listeners 300 and the operations management engines 230. The translation engine 210 communicates the feedback data to the operations management engine 230, which in turn is configured to update the feedback and/or perform requisite actions based on the feedback (e.g., determine case type and create a case type specific structured case).

For example, in the event that channel user responds to a summary by requesting a service (e.g., opening an account or the like) a service request may be generated and sent to an applicable operations management engine 214, which generates a structured case workflow for the service request (e.g., a case for opening an account or the like). In addition, the operations management engine 230 provides for end-to-end case lifecycle visibility, via the computer-mediated communication channels, to the channel user user/summary activity provider as the service request or the like is being processed/resolved. In addition, the operations management engine 230 provides for end-to-end case lifecycle visibility, via the computer-mediated communication channels, to the channel user/campaign feedback provider as may be dictated based on the nature of the feedback (e.g., creating a case or the like).

Figure 12:
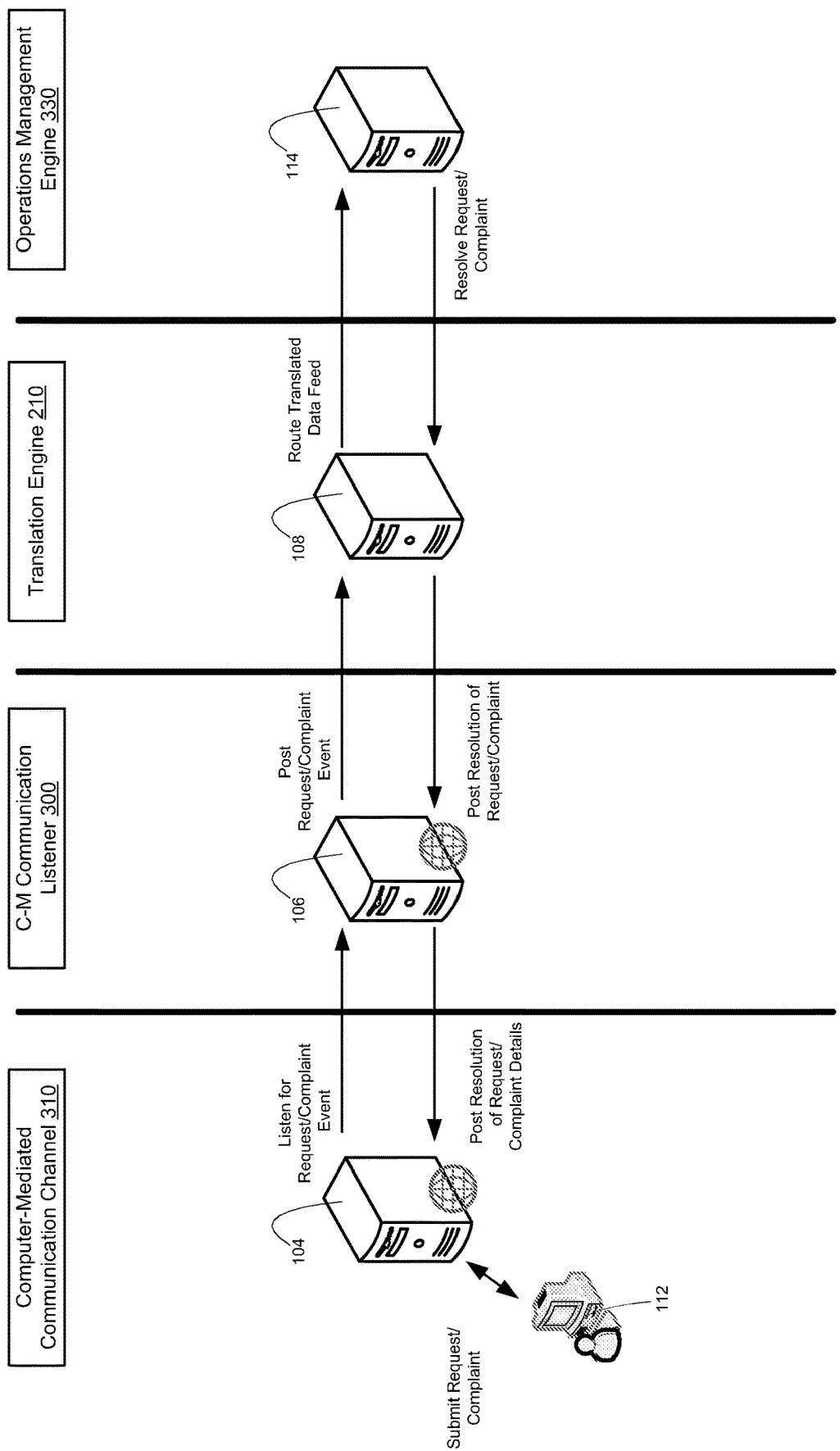

Referring to FIG. 12 a schematic diagram is shown of a use pattern for targeted content in which a user directly uses a communication mechanism within computer-mediated communication channel, such as a messaging service or the like to request a service (e.g., open an account or the like) or file compliant, in accordance with embodiments of the present invention. The service request or compliant. Which is case type-specific, is configured to open a direct structured workflow within the operations management engine. The user 112 submits a service request or files a complaint using a social media messaging service or some other communication mechanism.

The computer-mediated communication listener 300 is in communication with the various different web-based servers 104 associated with the channels 310 and listens for and collects/mines data associated with the service requests and/or complaints (i.e., user messaging inputs). Once data related to the service request/compliant is mined by the computer-related communication listener 300, web-based server 106 posts a details of the service request/compliant which is received by the translation engine 210 of server 50. As previously discussed, the translation engine 210 provides an API to integrate any operations management engine 230 irrespective of its language/configurations to the computer-mediated communication listener 300. The translation engine 110 provides the further benefit of securely isolating the operations management engine(s) 230 from the computer-mediated communication listeners. Once the structured service data/compliant data has been translated to a generic format, the translated data feed of the structured data is communicated by server 108 to server 110, which executes the operations management engine 230.

The operations management engine 230 is configured to generate a structured case workflow to process the service request or resolve the compliant. The results of the service request or the compliant resolution is communicated back to the user of the computer-mediated communication channel. The results data may be communicated to the translation engine 210, which implements an API to translate the result data to a generic format that is computer-mediated communication listener-agnostic. The translation engine 210 posts details of the results to the computer-mediated communication listener 300, which translates the results data from the generic format to a listener-specific format. In response, the computer-mediated communication listener 300 posts resolution/results data to the user via the same, or in some embodiments a different, messaging service used to submit the service request and/or file the complaint. In addition, the operations management engine 230 provides for end-to-end case lifecycle visibility, via the computer-mediated communication channels, to the channel user/as may be dictated based on the nature of the feedback.

Thus, as described above, embodiments of the present invention provide for seamlessly integrating disparate applications, such as channel applications and off-the-shelf business process management (BPM) services/applications through use of a core process framework that provides a vendor/third-party entity-agnostic approach to application integration. The core process framework of the present invention provides for various basic or otherwise "core" processes that are shared amongst applications that are in communication with the framework. Fundamental to the core process framework is the implementation of a headless BPM and middleware integration patterns that serve to create an open architecture with reduced dependency on the third-party entity/vendor providing the BPM service. In this regard, the core process framework of the present invention provides a service platform that clients (i.e., channel applications) can make service requests/calls to, via an integration gateway or the like, to perform multiple different generic BPM engine-related operations. data.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for integrating channel applications with business process management services, the apparatus comprising:
    a computing platform disposed within a distributed communication network and including a memory and at least one processor in communication with the memory; and
    a core process framework stored in the memory, executable by the processor and in communication with a core process engine that implements a headless business process management engine Application Programming Interface (API), wherein the core process framework is configured to:
    intercept service calls initiated by channel applications and intended for one of a plurality of business process management services,
    implement the headless business process management engine API to perform a plurality of generic business process management engine-related operations prior to forwarding the service call to the one of the plurality of business process management services, wherein the generic business process management engine-related operations include service call queue management and service call routing, and
    forward the service call to the business process management service in response to performing the plurality of generic business process management engine-related operations,
    wherein the headless business process management engine API provides for the plurality of generic business process management engine-related operations to be executed absent a Graphical User Interface (GUI).

2. The apparatus of claim 1, wherein the plurality of business process management services are provided by a corresponding one of a plurality of third-party entities and wherein the core process framework is further configured to perform the generic business process management engine-related operations in a third-party entity-agnostic manner.

3. The apparatus of claim 1, wherein the core process framework is configured to implement the headless business process management engine API to perform the plurality of generic business process management engine-related operations, wherein the business process management engine-related operations include translating the service call from a channel application computing language to a computing language that is compatible with the associated business process management service.

4. The apparatus of claim 1, wherein the core process framework is configured to implement the headless business process management engine API to perform the plurality of generic business process management engine-related operations, wherein the business process management engine-related operations include translating the service call from a channel application computing language to a computing language that is compatible with a user interface (UI) of the associated business process management service.

5. The apparatus of claim 1, wherein the core process framework implements a plurality of middleware integration patterns to perform the generic business process management engine-related operations for the associated business process management service.

6. The apparatus of claim 5, wherein the core process framework implements the plurality of middleware integration patterns to perform authentication and authorization.

7. The apparatus of claim 1, wherein the plurality of business process management services include at least one of (i) a case management service configured to manage incidents within an enterprise that are relegated to case status, (ii) a process analytics service configured to provide analytical data associated with enterprise processes, (iii) a mobile service configured to provide data in a mobile format for presentation on mobile platforms, and (iv) a social media service configured to communicate with social media listeners to receive enterprise-specific social media content and provide analytical data associated with the social media content.

8. The apparatus of claim 1, wherein the core process framework is configured to implement the headless business process management engine API to perform the plurality of generic business process management engine-related operations, wherein the generic business process management engine-related operations include user entitlement.

9. The apparatus of claim 1, wherein the core process framework is configured to provide for standardized error processing and, in response to incurring an error, alert notification.

10. The apparatus of claim 1, wherein the core process framework is configured to record in a log each action associated with the generic business process management engine-related operations and provide auditing functionality through access to the log.

11. A computer program product including a non-transitory computer-readable medium, the computer-readable medium comprising:
    a first set of codes for causing a computer to intercept, at a core process framework, a service call transmitted from a channel application prior to an intended business process management service receiving the service call;
    a second set of codes for causing a computer to implement, at the core process framework, a headless business process management engine application programming interface (API) to perform a plurality of generic business process management engine-related operations associated with the service call, wherein the generic business process management engine-related operations include service call queue management and service call routing, and wherein the headless business process management engine API provides for the plurality of generic business process management engine-related operations to be executed absent a Graphical User Interface (GUI); and a third set of codes for causing a computer to, in response to performing the plurality of generic business process management engine-related operations, forward, by the core process framework, the service call to the business process management service.

12. The computer program product of claim 11, wherein the second set of codes is further configured to cause the computer to implement, at the core process framework, a headless business process management engine API to perform the plurality of generic business process management engine-related operations, wherein the generic business process management engine-related operations include at least one of (i) translating the service call from a channel application computing language to a computing language that is compatible with the associated business process management service, and (ii) authentication and authorization.

13. The computer program product of claim 11, wherein the second set of codes is further configured to cause the computer to implement, at the core process framework, a headless business process management engine API to perform the plurality of generic business process management engine-related operations, wherein the generic business process management engine-related operations include user entitlement.

* * * * *